No. 684,368. Patented Oct. 8, 1901.
C. R. GREUTER.
STEERING APPARATUS FOR VEHICLES.
(Application filed Feb. 15, 1900.)
(No Model.) 3 Sheets—Sheet 1.

Witnesses
J. B. Malnati,
T. L. Jenkins.

Inventor:
Charles R. Greuter,
by Dodge and Sons,
Attorneys.

No. 684,368. Patented Oct. 8, 1901.
C. R. GREUTER.
STEERING APPARATUS FOR VEHICLES.
(Application filed Feb. 15, 1900.)
(No Model.) 3 Sheets—Sheet 2.
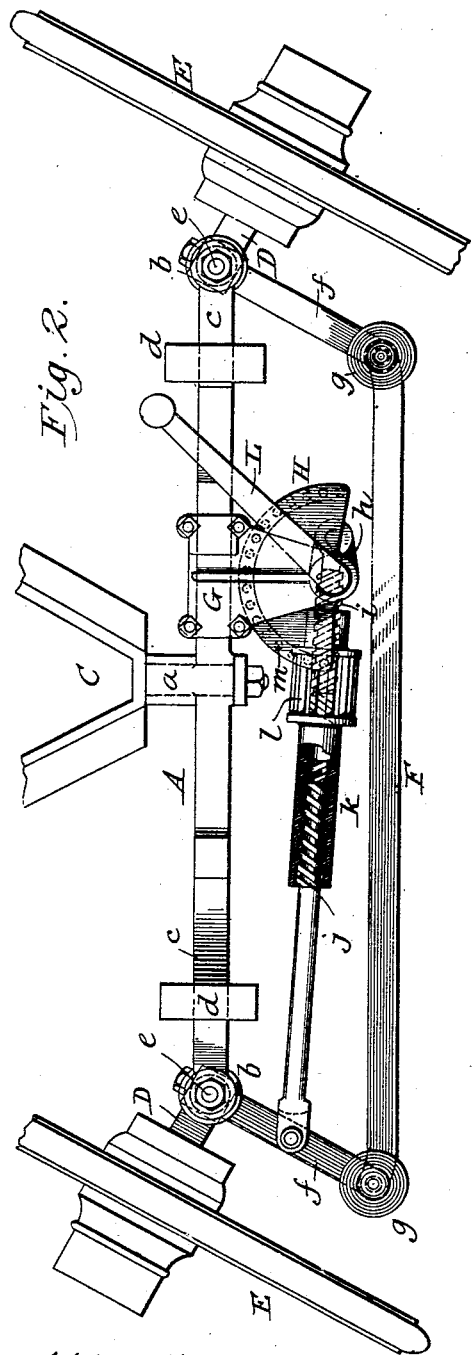
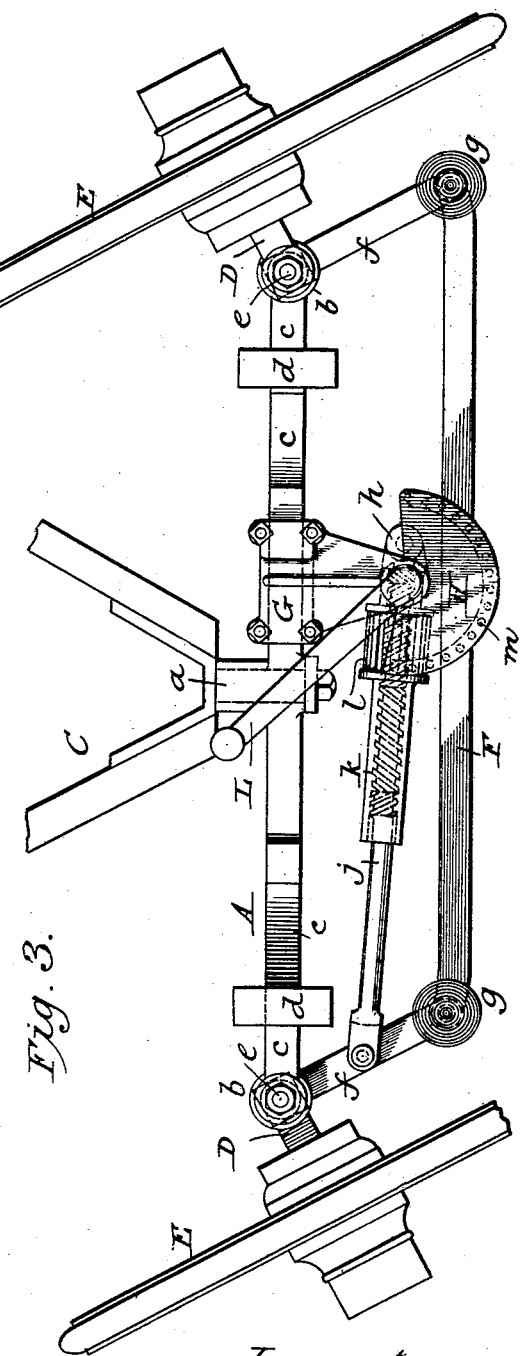

No. 684,368. Patented Oct. 8, 1901.
C. R. GREUTER.
STEERING APPARATUS FOR VEHICLES.
(Application filed Feb. 15, 1900.)
(No Model.) 3 Sheets—Sheet 3.

Witnesses
J. B. Malnati
J. L. Jenkins

Inventor:
Charles R. Greuter,
by Dodge and Sons,
Attorneys.

UNITED STATES PATENT OFFICE.

CHARLES R. GREUTER, OF HOLYOKE, MASSACHUSETTS, ASSIGNOR TO THE HOLYOKE AUTOMOBILE COMPANY, OF JERSEY CITY, NEW JERSEY.

STEERING APPARATUS FOR VEHICLES.

SPECIFICATION forming part of Letters Patent No. 684,368, dated October 8, 1901.

Application filed February 15, 1900. Serial No. 5,358. (No model.)

*To all whom it may concern:*

Be it known that I, CHARLES R. GREUTER, a citizen of the United States, residing at Holyoke, in the county of Hampden and State of Massachusetts, have invented certain new and useful Improvements in Steering Apparatus for Vehicles, of which the following is a specification.

This invention pertains to steering devices for vehicles, and is designed more particularly for use in that class of vehicles now generally designated as "automobiles," under which term are included all those vehicles designed for general road travel which contain their own propelling-power mechanism.

The invention is illustrated in the accompanying drawings, in which—

Figure 1:
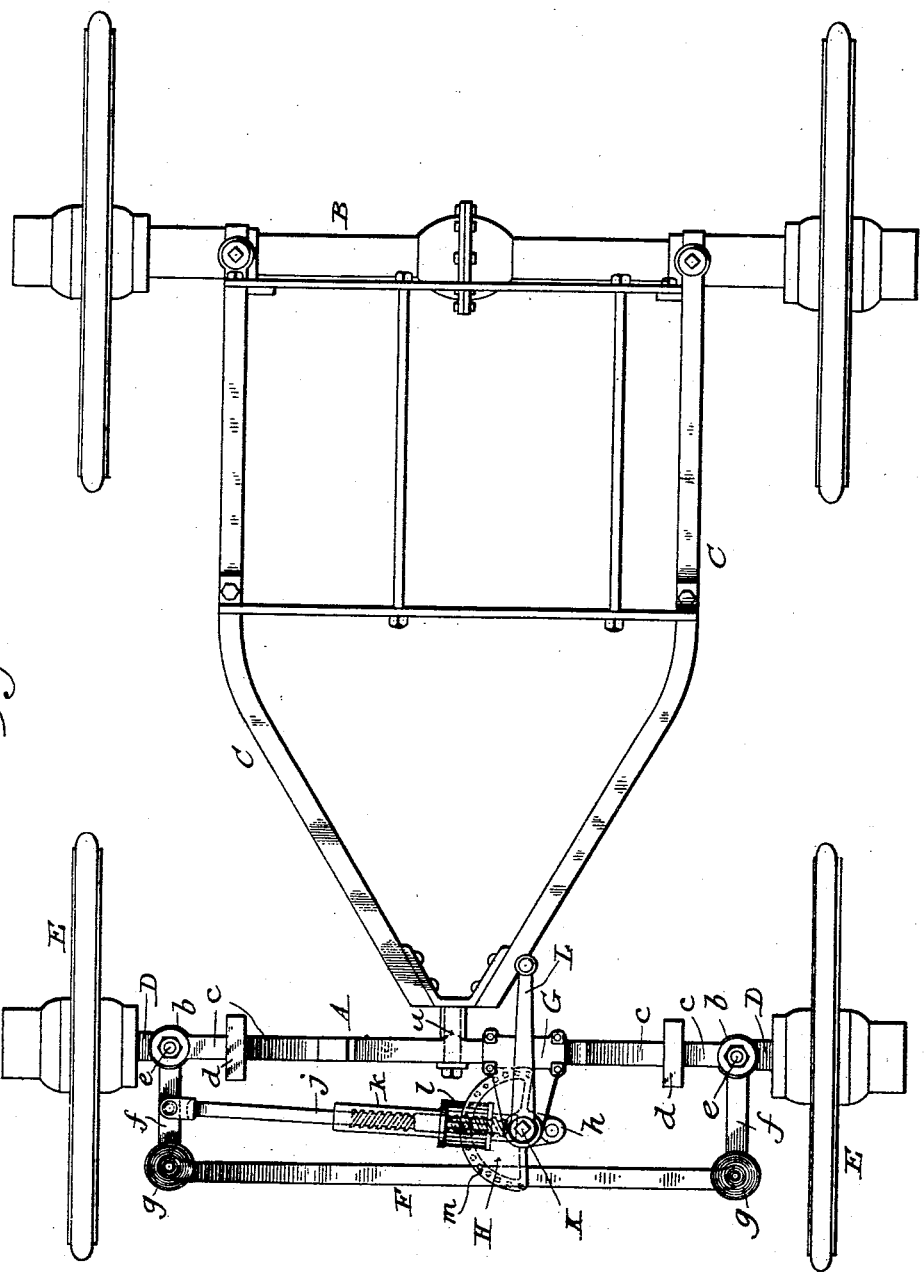
Figure 4:
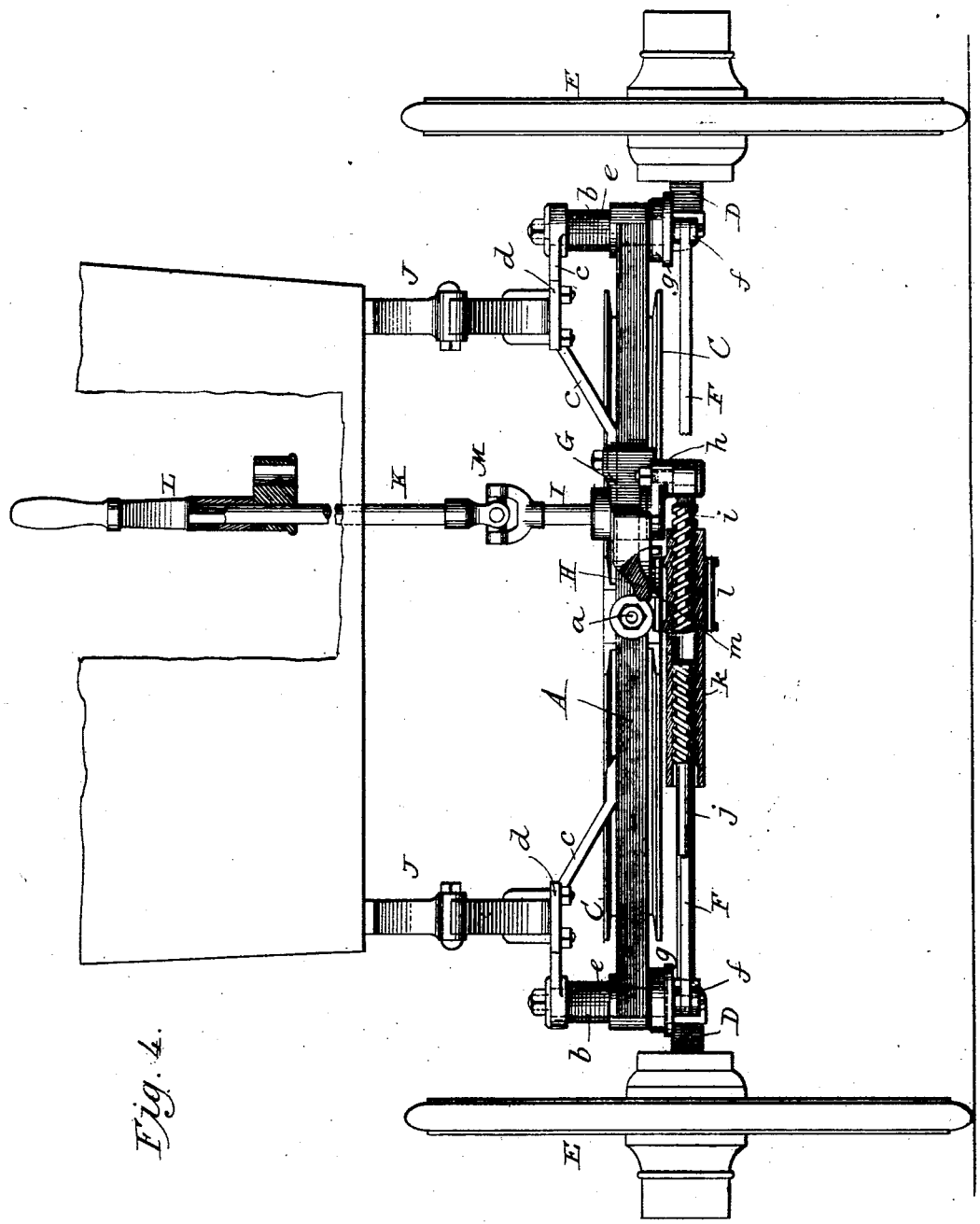

Figure 1 is a top plan view of the running-gear and steering mechanism of the vehicle embodying my invention; Figs. 2 and 3, top plan views of the steering mechanism proper, showing the same under two different adjustments, Fig. 2 showing a portion broken away to more clearly present to view the construction of the parts; Fig. 4, a front elevation of the vehicle, showing the steering-gear partially broken away or in section.

In this class of vehicles considerable difficulty has been experienced in devising a steering mechanism which while capable of bringing the vehicle readily into any desired path or direction of travel should also be free from danger of overmovement or of being thrown out of its proper line of travel by reason of encountering obstructions such as are commonly met with on the average roadway. It is desirable also in vehicles of this sort that the steering mechanism be so constructed as to retain the steering-wheels either in parallelism with the other wheels of the vehicle or at any desired angle thereto until such time as the operator shall see fit to change their relation. It is particularly desirable that the jar and vibration or concussion incident to the travel of the wheels over the roadway and to their meeting with uneven places, depressions or elevations in the road, stones, or other obstructions be not transmitted to the hand or arm of the steersman, experience having demonstrated that the transmission of this vibration and jar to the hand and arm of the steersman in a short time produces considerable pain and renders difficult the work of guiding and controlling the vehicle. In running at high speed, notably in speed contests, it has been observed that considerable headway is lost with ordinary steering mechanisms through inability of the steersman to hold the vehicle accurately to its course. All these points have been carefully considered in designing the present steering mechanism, and as a result there is produced a means of control which has proved itself admirably adapted to all requirements of actual use, whether upon smooth or upon rough roads. The power afforded is adequate, the response is prompt, the guidance is accurate, certain, and easily maintained, and the vibration is practically eliminated.

Referring to the accompanying drawings, A represents a forward axle-bar, B a rear axle, and C a connecting frame or perch, to which the forward axle-bar A is connected by a horizontal pivot stem or spindle $a$, as seen in the several figures. The details of the rear axle and connecting-frame are not material to the present invention, but may be varied as circumstances require or suggest. It is desirable, though not absolutely essential, that the horizontal pivotal connection $a$ be provided, its purpose being to permit the rise and fall of one or another wheel of the vehicle without wrenching or twisting the intermediate connecting frame or perch or compelling the other wheels to move in unison.

The axle-bar A is designed to maintain its parallelism with the rear axle B. Hence the usual king-bolt and fifth-wheel are omitted. At each end said axle-bar A is fashioned into or is provided with a vertical sleeve $b$, which it is deemed advisable to stiffen and brace at its upper end by a bracing bar or member $c$, (shown in the several figures,) said brace being broadened out at suitable points to form upon each a spring platform or rest $d$. The precise manner of staying the sleeves $b$ is, however, immaterial, and they may, if desired, be made integral with the axle-bar and unprovided with braces. The construction shown is, however, that which has been adopted in actual use and is found well adapted to the purpose in view.

At each end of the axle-bar A is carried a spindle or stud-axle D, the outer portion of which is of circular cross-section to fit the boxes of ground-wheels E, the usual nuts or other retaining devices being applied to keep the wheels in place thereon. Each spindle or stud-axle is provided with a vertical stem or neck e, (seen in the several plan views and shown by dotted lines in the front elevation, Fig. 4,) said stems being nicely fitted within the shells b and adapted to turn therein to permit the stud-axles or spindles and their wheels to take any desired angles relatively to the axle-bar A.

To cause the two stud-axles to move simultaneously and equally about their pivot-axes, and consequently to maintain the ground-wheels E always in parallel planes, each stud-axle D is provided with an arm f, preferably extending forward therefrom, as shown in Figs. 1, 2, and 3, said arms being connected by a bar F. The arms f may also carry steps or foot-plates g to facilitate mounting or entering the vehicle.

For the purpose of moving the spindles or stud-axles horizontally or about their pivot-axes I provide between one of the arms f thereof and a relatively fixed member a sectional connecting-rod, the proximate ends of which are threaded in reverse directions and connected by a long nut or sleeve correspondingly threaded, producing a species of turnbuckle. By rotating this sleeve or turnbuckle the connecting-rod may be lengthened or shortened, and the arm f of the stud-axle may thereby be pushed in one or pulled in the reverse direction, and thereby caused to swing the connected stud-axles about their pivot-axes.

Rotation of the sleeve or shell is effected by gearing provided with a winch or crank-handle placed within easy reach and always under the control of the motorman or person in charge of the vehicle. The preferred embodiment of this mechanism is represented in the accompanying drawings and is shown in three different positions in Figs. 1, 2, and 3. The relatively-fixed member or support above referred to is shown in the form of a bracket G, which may conveniently be clamped or bolted upon the axle-bar A, as shown in the several figures, and made to extend forward therefrom to a point between said bar and the bar F, which connects the arms f of the stud-axles or spindles D.

Extending downward below the body of the bracket G is an arm h, to which is pin-jointed or otherwise pivotally connected a horizontal screw-threaded rod or member i, which, together with a second threaded rod or member j, pin-jointed or otherwise pivotally connected with an arm f of one of the stud-axles D and with an outer sleeve or shell k, constitutes a connection between the fixed support h and said arm f. As best shown in Fig. 4, the rod-sections i and j are screw-threaded in reverse directions, and the shell or sleeve k is internally threaded or tapped to receive from opposite ends said threaded rod-sections. It is apparent that if the sleeve thus formed be rotated upon the rod-sections threaded as shown and described it will cause said sections to approach or to recede from each other, according to the direction of such rotation, the rod-sections themselves being incapable of turning by reason of their connection, respectively, with the arm f and bracket or support h.

For the purpose of conveniently rotating the shell or sleeve k it is provided with a lantern-pinion or trundle-gear l, which may conveniently be made integral with the sleeve so far, at least, as concerns the heads or trundle-carrying disks thereof, and with this is combined a sector-gear H, the teeth m of which are advisably in the form of short cylindrical studs or pins, adapted to enter between the rods or rundles of the lantern-pinion, as indicated in the several figures, though shown somewhat more clearly in Fig. 4 than in the others. The term "lantern-pinion" is here used to mean or indicate a pinion with elongated narrow teeth, and though the form shown—that is to say, a pinion having cylindrical rundles or rods for teeth—is preferred it is evident that any pinion of adequate length to compensate for or admit of longitudinal play such as here described will answer the purpose, provided the teeth be relatively narrow and reasonably wide apart to permit free entrance and exit of the teeth of the sector-gear. The sector-gear H is held between an upper and a lower arm of the bracket G and is thereby caused to maintain with certainty its relation to and engagement with the lantern-pinion or trundle l. It is rotated by a vertical rod or shaft I, passing through the upper arm of the bracket and through the hub of the sector-gear and either stepped in or passing through the lower arm of said bracket.

That portion of the rod or shaft I which is seated within the hub or body of the sector-gear H is squared or made of other polygonal form to prevent its turning within or independently of the gear and to cause the latter to turn with it. With the ordinary style or construction of the vehicle thus far adopted the body of the vehicle is somewhat above the axle-bar A, being carried upon springs J, as indicated in Fig. 4, and a second shaft length or section K is therefore connected with the shaft I and carried upward through the floor of the vehicle to a convenient height to receive a winch or hand-lever L, by which to turn it. As there is a certain amount of movement of the axle-bar relatively to or independently of the vehicle-body, and vice versa, it is necessary or at least advisable to interpose between the two shaft-sections I and K a universal joint or coupling which shall permit the requisite amount of relative movement. Such a joint is represented at M in Fig. 4; but it is to be understood that instead of that shown any other form of coupling—as, for instance, the well-known tumbling-rod connection—may be employed. In view of the fact that the rocking or tipping movement of the axle-bar A about the pivot $a$ is in any event small and that the bracket G and the connection M are located in somewhat close proximity to said pivot the movement at said coupling is so slight as to be of no serious consequence. Obviously, however, any form of flexible connection or universal joint may be introduced to prevent interference with the working of the shaft K.

It will be observed that when the winch or handle L is swung about the axis of shaft K the sector-gear H will be correspondingly turned and will rotate the sleeve $k$, thereby lengthening or shortening the connection between arm or support $h$ and the arm $f$ of the stud-axle, causing the stud-axles to swing about their pivot-stems $e$ and to set the wheels to carry the vehicle to the right, as indicated in Fig. 2, or to the left, as in Fig. 3. It will also be observed upon reference to Figs. 1, 2, and 3 that the parts are so proportioned and the winch or handle L is so set that its position relatively to the direction of travel of the vehicle at all times corresponds to the pointing or angle of the wheels E, thus enabling the motorman or person in charge of the vehicle to steer by said winch or handle, merely pointing the same toward the object or point to be reached, without paying any attention to the wheels themselves. This is a matter of very considerable practical value, since it gives to the steersman an infallible guide to the steering of the vehicle. It will be seen, too, that by this arrangement the necessity for making a long movement of the lever or, as is required with many constructions, a series of turns of the handle is wholly obviated. The turnbuckle or right and left threaded sleeve affords at once a relatively quick movement, varying, of course, with the pitch of the threads, and also gives adequate power. With screw-threads of any usual pitch it will also serve as a locking device, preventing the elongation or the shortening of the two-part rod $i j$ through any sudden strain brought upon the wheels tending to turn them from the course to which they are set.

It is obvious that instead of making the connection between the bracket or support $h$ and the arm $f$ of one external and two internal members the construction may be reversed—that is to say, the middle section $k$, provided with the lantern-gear, may be in the form of a rod having its ends threaded right and left to enter sleeves occupying the positions of the threaded rods $i$ and $j$ in the drawings, the action being, however, precisely the same as above set forth. In other words, the parts $i$, $j$, and $k$ may be reversed without in any manner departing from the spirit or scope of the invention. It will also be apparent that a single steering-wheel might be employed and its position controlled by a rod or connection capable of extension and contraction, essentially as above set forth, or that the said connection might be made between the usual horizontally-swinging front axle of a vehicle and the body, perch, or other relatively-fixed portion thereof.

The employment of the double or right and left screw construction is advantageous in that it gives a quicker movement or greater travel for given rotation of the rotary member and pitch of thread; but it will be seen that there may be a simple swivel connection for the sleeve with one or the other section of the rod $i j$.

It is particularly to be noted that under the construction here set forth and by use of the extensible and contractible rod or connection, having at one end a fixed support and pin jointed or connected at the opposite end to a lateral arm of the axle-spindle, I maintain at all times between the fixed support and the point of connection a straight-line connection in the direction of the axis of the screw and nut. In this way I obtain the greatest pushing and pulling effect possible without danger of springing, buckling, or cramping the coacting threaded portion, and consequently am enabled not only to move the wheels easily and quickly in any required direction, but also to hold them rigidly and without fear of springing or buckling the connecting parts, whatever position they may assume. By reason of this straight-line connection I am enabled to make the parts materially lighter than would otherwise be consistent with due strength and safety.

Having thus described my invention, what I claim is—

1. In combination with a steering-wheel of a vehicle, a relatively-fixed support upon said vehicle; a two-part rod or connection interposed between the axle or spindle of the steering-wheel and said support and pivotally connected with the latter; and a nut threaded to receive a section of the two-part rod and carried by the other section, substantially as described.

2. In combination with a main axle-bar, and with axle-spindles pivotally attached thereto and connected with each other, a steering or adjusting device, comprising a two-part rod, and intermediate nut; said rod connected at one end with one of said spindles and at the other end with a fixed support, substantially as and for the purpose set forth.

3. In a steering apparatus for vehicles, the combination with a wheel axle or spindle movable about a vertical axis; an arm connected with said spindle and projecting horizontally therefrom; a relatively-fixed support in or upon the vehicle; a two-part rod or connection between the projecting arm of the spindle and the fixed support; and a nut or threaded sleeve connecting the rod-sections and adapted to be rotated relatively thereto; and means, substantially such as shown and described, for rotating said nut.

4. In combination with a fixed axle bar or support, a stud-axle or spindle D provided with a vertical pivot $e$ and arm $f$; a relatively-fixed bracket or support $h$; and a turnbuckle connecting the arm $f$ and bracket $h$, and comprising threaded rod-sections $i, j$ and connecting sleeve or nut $k$, substantially as shown and described.

5. In combination with axle-bar A, horizontally-movable spindles or stud-axles D pivotally attached thereto and provided with arms $f$; bar F connecting said arms $f$; bracket G provided with arm or support $h$; extensible rod or connection comprising threaded sections $i$ and $j$ and internally-threaded section $k$, the latter provided with a lantern-wheel or trundle $l$; sector-gear H having teeth or studs $m$ to engage with the rundles of the lantern-wheel; and means substantially as described for turning said sector-gear about its axis.

6. In combination with axle-bar A, and stud-axles or spindles D pivotally attached thereto and provided with arms $f$; bar F connecting said arms; a fixed bracket or support G carried by the axle-bar A and provided with arm or bracket $h$; turnbuckle $i, j, k$, connecting the arm $h$ and one of the arms $f$; a lantern-gear carried by the sleeve $k$; a sector-gear H carried by the bracket G and meshing with said lantern-gear; a shaft I extending upward from the sector-gear; a second shaft K above the shaft I; a flexible coupling or connection M between the shafts I and K; and a hand-lever applied to the shaft K and serving to rotate the same.

7. In combination with the axle-bar A; sleeves or shells $b$; braces $c$ attached to the axle-bar and to the sleeves or shells; axle-spindles D provided with vertical pivot-stems $e$ to enter said shells, and with arms $f$; bar F connecting said arms; bracket G provided with arm $h$; turnbuckle $i, j, k$, connecting the arm $h$ with an arm $f$ of one of the stud-axles; and means substantially as shown and described for rotating a member of the turnbuckle.

In witness whereof I hereunto set my hand in the presence of two witnesses.

CHARLES R. GREUTER.

Witnesses:
ANDREW H. MATHESON,
ARTHUR E. PHELON.